(12) United States Patent
Klass et al.

(10) Patent No.: US 9,540,924 B2
(45) Date of Patent: Jan. 10, 2017

(54) OPTICAL DEVICE FOR USE WITH DOWNHOLE EQUIPMENT

(75) Inventors: Michael Alan Klass, Winthrop (AU); Gordon Henderson Stewart, Claremount (AU)

(73) Assignee: Globaltech Corporation Pty Ltd, Canning Vale (AU)

( * ) Notice: Subject to any disclaimer, the term of this patent is extended or adjusted under 35 U.S.C. 154(b) by 356 days.

(21) Appl. No.: 14/234,843

(22) PCT Filed: Aug. 15, 2012

(86) PCT No.: PCT/AU2012/000958
§ 371 (c)(1),
(2), (4) Date: Aug. 12, 2014

(87) PCT Pub. No.: WO2013/023245
PCT Pub. Date: Feb. 21, 2013

(65) Prior Publication Data
US 2014/0354445 A1    Dec. 4, 2014

(30) Foreign Application Priority Data
Aug. 15, 2011    (AU) ................................ 2011903257

(51) Int. Cl.
*E21B 47/12*   (2012.01)
*G02B 6/42*    (2006.01)
*H04B 10/00*   (2013.01)
*H04B 13/00*   (2006.01)

(52) U.S. Cl.
CPC ........... *E21B 47/123* (2013.01); *G02B 6/4214* (2013.01); *H04B 10/00* (2013.01); *H04B 13/00* (2013.01)

(58) Field of Classification Search
CPC ..................................................... E21B 47/123
See application file for complete search history.

(56) References Cited

U.S. PATENT DOCUMENTS

| | | | |
|---|---|---|---|
| 5,786,925 A | 7/1998 | Goossen et al. | |
| 6,236,786 B1 | 5/2001 | Aoki et al. | |
| 7,584,055 B2 | 9/2009 | Parfitt | |
| 2003/0219201 A1 | 11/2003 | Arimoto et al. | |
| 2015/0027243 A1* | 1/2015 | Maity | G01D 11/30 73/866.5 |

FOREIGN PATENT DOCUMENTS

| | | |
|---|---|---|
| AU | 2006100113 A4 | 3/2006 |
| CA | 2456506 | 2/2004 |
| WO | 03079069 A2 | 9/2003 |
| WO | 2010080159 A1 | 7/2010 |

* cited by examiner

*Primary Examiner* — Jerry Rahll
(74) *Attorney, Agent, or Firm* — Charles H. Jew

(57) ABSTRACT

An optical device (32) transfers an optical signal to or from an electronics unit (30) used in relation to downhole equipment of a drilling operation. The device includes a body (38) and an optical signal direction or light path altering means (40), the body having a light path arranged to allow the optical signal from a light source (16,18) associated with the electronics unit to pass to the optical signal direction altering means, the optical signal direction altering means arranged to cause the optical signal to change direction of travel within the body of the optical device.

40 Claims, 2 Drawing Sheets

OPTICAL DEVICE FOR USE WITH DOWNHOLE EQUIPMENT

FIELD OF THE INVENTION

The present invention relates to devices enabling data to be transmitted to and from downhole equipment, such as core orientation units and borehole telemetry probes.

BACKGROUND TO THE INVENTION

Core orientation is the process of obtaining and marking the orientation of a core sample from a drilling operation.

The orientation of the sample is determined with regard to its original position in a body of material, such as rock or ore deposits underground.

Core orientation is recorded during drilling, and analysis is undertaken during core logging. The core logging process requires the use of systems to measure the angles of the geological features, such as an integrated core logging system.

Whilst depth and azimuth are used as important indicators of core position, they are generally inadequate on their own to determine the original position and attitude of subsurface geological features. Core orientation i.e. which side of the core was facing the bottom (or top) of a borehole and rotational orientation compared to surrounding material, enables such details to be determined.

Through core orientation, it is possible to understand the geology of a subsurface region and from that make strategic decisions on future mining or drilling operations, such as economic feasibility, predicted ore body volume, and layout planning.

In the construction industry, core orientation can reveal geological features that may affect siting or structural foundations for buildings. Core samples are cylindrical in shape, typically around 3 meters long, and are obtained by drilling with an annular hollow core drill into subsurface material, such as sediment and rock, and recovering the core sample.

A diamond tipped drill bit is used at the end of the hollow drill string. As the drill progresses deeper, more sections of hollow steel drill tube are added to extend the drill string. An inner tube assembly captures the core sample. This inner tube assembly remains stationary while the outer tubes rotate with the drill bit. Thus, the core sample is pushed into the inner tube.

A 'back end' assembly connects to a greaser. This greaser lubricates the back end assembly which rotates with the outer casing while the greaser remains stationary with the inner tubing.

Once a core sample is cut, the inner tube assembly is recovered by winching to the surface. After removal of the back end assembly from the inner tube assembly, the core sample is recovered and catalogued for analysis.

Various core orientation systems have previously been used or proposed. Traditional systems use a spear and clay impression arrangement where a spear is thrown down the drill string and makes an impression in clay material at an upper end of the core sample. This impression can be used to vindicate the orientation of the core at the time and position the spear impacted the clay.

A more recent system of determining core orientation is proposed in Australian patent number 2006100113 (also as U.S. Pat. No. 7,584,055). This patent document describes a core orientation device for a core drill. The device provides signals associated with a physical orientation of a core orientation device for a particular moment in time. The device includes a memory for storing and providing the orientation data when required.

The system described in AU 2006100113 provides a two unit replacement for the greaser described above. A first orientation system unit houses electronics and a battery used to record orientation data, and the second greaser unit is an extended greaser accommodating a physical screw on connector for the first unit as well as serving as the greaser. This combination forms part of the inner tube assembly with the core tube, orientation system 'first' unit and the connector/greaser 'second' unit.

However, as a result of the now extended length of the combined orientation system and greaser units compared with a standard greaser only unit, the outer drill string casing now requires a matching extension piece to extend the outer casing an equal amount. The core orientation system has a display on one face which is used when setting up the unit prior to deployment, and to indicate core sample alignment when the core sample is recovered. At the surface before removing the core sample from the inner tube assembly, the operator views the display fitted on the system. The display indicates for the operator to rotate the unit and the sample within the tube until the whole core tube and sample is oriented with the lower section of the core sample at the lower end of the tube. The core sample is marked (usually by pencil) before being removed from the core for future analysis.

However, the device described in AU 2006100113 has been found to have certain limitations. The orientation unit is connected to the greaser by a screw thread and o-ring seal arrangement. In the harsh down hole environment within the drill string, it has been realised that the o-ring seals are not always effective and can let fluid into the space between the orientation unit and the greaser. The display unit allows fluid into the electronics of the orientation, resulting in a risk of fault or failure of the device. Furthermore, the orientation unit must be disassembled from the greaser unit before the display and orientation unit can be viewed, rotated and the required core orientation displayed. Thus, the device of AU 2006100113 requires manual manipulation before any reading can be viewed on the display, if the display and the electronics have survived any ingress of fluid past the o-ring seal.

Similar issues arise with downhole probes that are used to obtain borehole telemetry data to determine drilling progress, such as depth and direction of the borehole and change in surrounding magnetic field.

Typically the downhole equipment is brought to the surface once sufficient data is gathered or task completed, such as obtaining a core sample. It is common practice to manually have to separate the backend assembly from an electronics package used for gathering downhole data. This task involves unscrewing the backend assembly from the electronics package, which takes time and risks thread damage as well as resulting in risk of ingress of dirt and water into the thread. Also, o-ring seals protecting the electronics unit may be compromised through separation and refitting of the backend assembly and electronics unit. Similar issues exist with separating the electronics unit of a downhole probe from its backend assembly.

It has been found desirable to provide means of obtaining signals/data from or providing signals/data to downhole equipment electronics units, such as used in core sample orientation units or downhole probes.

One improved system is described in the applicant's international patent application PCT/AU2011/000954, the contents of which are incorporated herein in its entirety. At least one embodiment described in PCT/AU2011/000954 utilises an optical device extending from an end of a data gathering device, such as an electronics unit, into an end of a greaser unit. Light from LEDs in the data gathering device is reflected out of apertures in the greaser unit behind the optical device. The present invention improves on such a system.

With this in mind, it has been found desirable to provide improved means for obtaining signals/data from or providing signals/data to an electronics unit of downhole equipment.

SUMMARY OF THE INVENTION

With the aforementioned in mind, in one aspect the present invention provides an optical device that transfers at least one optical signal to or from an electronics unit of downhole equipment, the optical device including a body and an optical signal direction altering means, the body having a light path arranged to allow the optical signal from a light source associated with the electronics unit to pass to the optical signal direction altering means, the optical signal direction altering means causing the optical signal to change direction of travel.

The optical device may be a unitary or monolithic device.

The optical device may be configured for at least partial insertion or mounting or moulding into a casing/housing of an electronics unit of downhole equipment.

Alternatively, the device may be formed of multiple parts, which may be bonded together or otherwise held together.

The optical signal direction altering means may act on optical signals incoming to the electronics unit and/or outgoing from the electronics unit.

The optical signal direction means may include a boundary of or within the body of the optical device. For example, refraction may occur at a surface edge of the optical device. The boundary and/or the nature of the material (refractive index) may be used to change the path of the light in order to transfer the light signal via the device.

Alternatively, refraction may occur at a change of material or material density within the body of the optical device. Such refraction may cause the transmitted optical signal to emit sideways/transversely with respect to a longitudinal extent of the optical device.

The optical device may include a reflector. The reflector may include a reflective material applied or formed on or within the body. For example, a reflective coating, such as a silvered or polished coating may be provided on an end portion of the optical device.

Alternatively, the reflector may be embedded within or attached to the optical device.

A reflective surface may be provided on a portion projecting into the body. For example, the body may include a recessed end portion that forms an internally projecting conical, domed, facetted and/or tapered end surface of the body. However, the reflective surface is not necessarily required provided the surface is sufficiently inherently reflective or is polished.

The recessed end portion may have a reflective coating applied or a reflective material attached such a silvered paint, aluminium deposition, glitter etc. The reflective surface acts to diffract the optical signal travelling within the light path to emit out of the optical device.

Preferably the transmitted signal emits to the side of the device, which is beneficial in aiding signal detection through at least one overlying aperture formed or provided in the downhole equipment. Such at least one aperture may be the water supply hole(s) through a greaser unit or at least one aperture provided in part of a downhole probe assembly.

The optical device may be formed of a glass and/or plastics material. In at least one preferred form of the present invention the optical device may include one piece body, such as a moulded and/or machined plastics or glass material.

Preferably the material of the body is substantially transparent to the light travelling through it. For example, the light path may be formed by the body of the optical device being transparent to the optical signal passing through the material of the body. Alternatively the light path may be provided by a light transmitting conduit within the body.

At least a portion of the optical device may be configured to fit within an end of housing/casing of an electronics unit. An end portion of the optical device may be configured to extend from the end of the electronics unit so as to extend into a housing/casing of a piece of downhole equipment once assembled together. For example, an end of the optical device from where light is to be emitted when an optical signal is conveyed from the electronics unit may extend into a greaser unit so that light can emit from or into one or more apertures through a side wall of the greaser unit.

The electronics unit (and hence the optical device) may be connected to other equipment, such as a portion of a downhole probe.

An advantage of the present invention is that the greaser or other equipment to which the electronics unit attaches does not need to be separated from the electronics unit in order to obtain access and communicate with the device to obtain data. This avoids needing to unscrew components of the downhole equipment and risk ingress of dirt/water or damaged threads, as well as reduces time taken to obtain data.

In addition, the electronics unit can be started or stopped remotely and at the most opportune time. For example, in known devices an operator usually delays turning on the electronics unit until the last minute in order to conserve the unit's onboard battery power. The operator then starts the electronics unit and assembles the unit to the other equipment, such as a greaser or probe assembly.

The present invention avoids the need for such urgent activity by allowing an operator to switch the unit on or off by sending an optical signal from a hand held device to the optical device through an overlying aperture, the device then transmitting the optical signal to the electronics unit to activate/deactivate the unit. Data to/from the unit can also be sent/received utilising the same optical device.

An end portion of the optical device may be configured to extend from the end of the electronics unit so as to extend into a housing/casing of a piece of downhole equipment once assembled together. For example, an end of the optical device from where light is to be emitted when an optical signal is conveyed from the electronics unit may extend into a greaser unit so that light can emit from or into one or more apertures through a side wall of the greaser unit. The electronics unit (and hence the optical device) may be connected to other equipment, such as a portion of a downhole probe.

The direction of the light signal may be altered within the body of the optical device or a surface of the device, or a combination of both.

A further aspect of the present invention provides downhole equipment having an electronics unit configured to obtain data relating to a borehole into which the electronics unit is inserted or to obtain data relating to equipment used within the borehole system, and an optical device associated with the electronics unit, and an optical device according to any one of the preceding claims configured to enable optical signals to be transmitted to or received from the electronics unit whilst the electronics unit is connected to the downhole equipment.

The device may include material that is optically transparent and a reflector may be provided within are on an opposite side of the material from which the light enters. Alternatively or in addition, the material may include material a refractive index such that light passing into a portion of the device is caused to change direction within the material.

A still further aspect of the present invention provides a downhole data gathering system, including a communication device arranged to communicate wirelessly with an electronics unit of downhole equipment, the downhole equipment including an electronics unit configured to obtain data relating to a borehole into which the electronics unit is inserted or to obtain data relating to equipment used within the borehole system, and an optical device according to any one of the preceding claims configured to enable optical signals to be transmitted to or received from the electronics unit whilst the electronics unit is connected to the downhole equipment, the optical device enabling transmission of signals from the electronics unit to the wireless communication device, or from the wireless communication device to the electronics unit, through at least one aperture in a side wall of the downhole equipment.

Because one or more embodiments of the present invention enable optical transmission to and from an electronics unit, the optical device may be termed an optical transceiver.

DESCRIPTION OF PREFERRED EMBODIMENT

Figure 1:
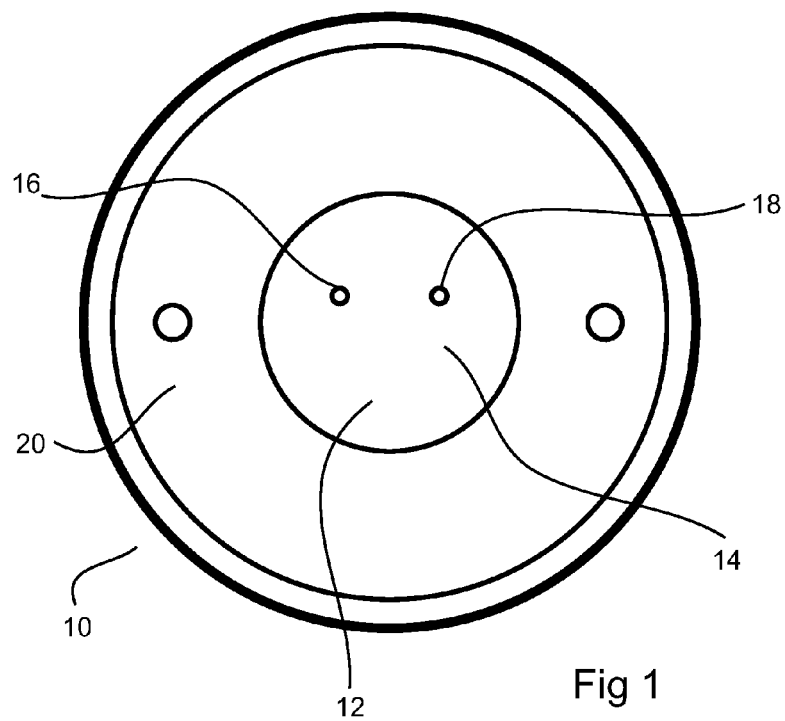
FIG. 1 shows an end on view of a core sample orientation device or downhole probe having indicator window whereby indicator lights provide optical signals to an optical device according to an embodiment of the present invention.

As shown in FIG. 1, the indicator window end 12 of an electronics unit of a core sample orientation data gathering device 10 includes a window 14. Indicator lights 16,18 can be seen through this window at least when illuminated. The window end is sealed by a retaining plate 20. Two lights e.g. red and green LEDs are shown, though there may be more or less lights. The left hand 16 (red) LED illuminates to indicate to a user to rotate the unit 10 anti-clockwise. The right hand 18 (green) LED illuminates to indicate to a user to rotate the unit 10 anti-clockwise. When correct core sample orientation is achieved, both LEDs might illuminate, such as steady or flashing red and green, or another illuminated indication might be given, such as a white light (steady or flashing).

The aforementioned electronics unit, or a variant thereof, may be used with a variety of downhole equipment.

The aforementioned variant is for application in obtaining core samples. In an example utilising core sample data gathering, once a core sample is obtained, an inner tube assembly with a data gathering device electronics unit and greaser are recovered back to the surface, the back end assembly and greaser are removed.

Using an infra red link or other wireless link, the electronics unit is put into orientation indicating mode by the remote communication device.

The core sample and electronics unit are then rotated either clockwise or anti clockwise to establish a required orientation position. The remote communication device is then used to communicate with the electronics unit to obtain core sample orientation data from the electronics unit.

No LCD or other display is needed on the data gathering device that might otherwise risk leakage in use and ingress of liquid or failure of the display due to display power demands on the limited battery life or display failure due to the harsh environment downhole.

The required orientation of the core sample is then marked and the core sample can be stored and used for future analysis. The received data can be transferred to a computer for analysis.

Figure 2A:
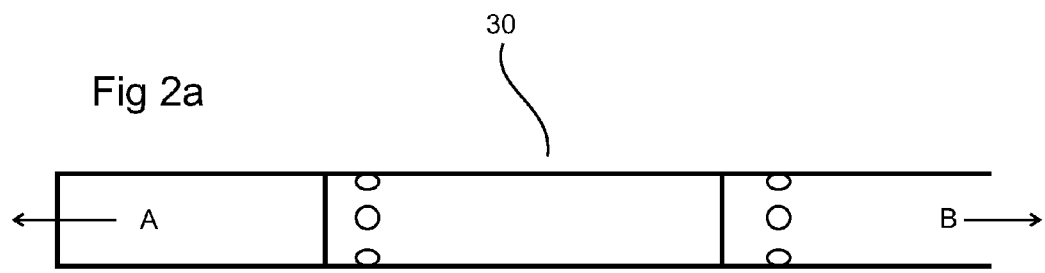
FIGS. 2a and 2b show an arrangement of a data gathering device incorporating an optical device.
Figure 2B:
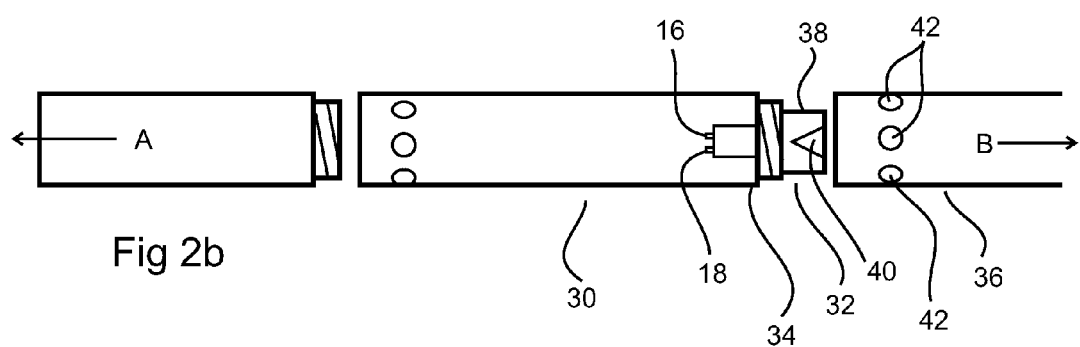

As shown in FIGS. 2a and 2b, an electronics unit 30 for gathering data downhole houses the light emitters 16,18. Light from these emitters (e.g. LEDs) passes through the window 14 (shown in FIG. 1).

Reference arrow A refers to the drill bit end direction, and reference arrow B refers to the backend assembly direction.

An optical device 32 according to an embodiment of the present invention is provided at the end 34 of the electronics unit 30 and which device extends into the greaser unit 36 of the backend assembly when connected thereto.

The optical device has a body 38 and a light path altering means 40. The body also defines a light path therethrough (see FIG. 3) arranged to allow the optical signal from a light source(s) 16,18 associated with the electronics unit to pass to the light path altering means.

The light path altering means 40 can be arranged to cause the optical signal from/to the electronics unit to change direction of travel and emit out of the body/into the body of the optical device.

The greaser unit 36 has apertures 42 that allow light therethrough. Light from the emitters is directed onto at least one light path altering means of the device.

The emitted light can be observed through the apertures 42 in the greaser.

It will be appreciated that the device need not extend into a greaser. A tube section or other component having at least one aperture to observe the light through is sufficient, such as in a probe tool.

The red-green indications (or whatever selected colour combination of light is used) can be observed through the aperture(s) when a remote device (such as a handheld device) reads the optical data signal. Also, a handheld device can transmit data via an optical signal or use a transmitted optical signal to operate the electronics unit or store data in the unit. Thus, advantageously, when the unit is recovered from down the hole, the unit need not be separated from the rest of the downhole equipment in order to determine required information or control the electronics unit. Thus, wireless communication to/from a remote device, such as a hand held device, to transfer data between the electronics unit and the remote device, can also be effected by transmitting through the at least one aperture.

Embodiments of the present invention provide the advantage of a fully operating downhole electronics unit without having to disconnect or disassemble the unit from the inner tube and/or from the backend assembly or any other part of the drilling assembly that the unit would need to be assembled within for its normal operation.

Disconnecting or disassembling the unit from the backend and/or inner tube risks failure of seals at those connections and/or risks cross threading of the joining thread. Also, because those sections are threaded together with high force, it takes substantial manual force and large equipment to separate the sections.

High surrounding pressure in the drill hole means that the connecting seals between sections must function perfectly otherwise water and dirt may ingress into and damage the device.

Having an electronics unit that does not need to be separated from the inner tube and/or backend sections in order to determine core sample orientation and/or to gather data recorded by the unit means that there is less risk of equipment failure and drilling downtime, as well as reduced equipment handling time through not having to separate the sections in order to otherwise obtain core sample orientation. Known systems require end on interrogation of the unit. By providing a sealed unit and the facility to determine orientation of the core sample, by observing the orientation indications through one or more apertures in the side of the greaser or other section, reliability and efficiency of core sample collection and orientating is improved. Consequently operational personnel risk injury, as well as additional downtime of the drilling operation. Without having to separate the unit from the inner tube and/or backend, the orientation of the core sample can be determined and the gathered information retrieved with less drilling delay and risk of equipment damage/failure.

Figure 3:
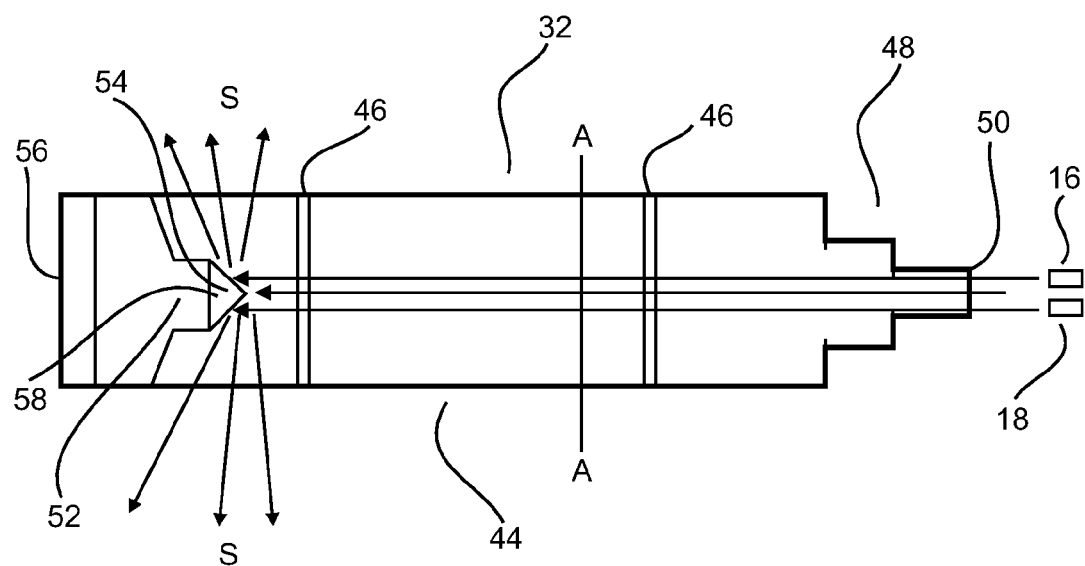
FIG. 3 shows an optical device according to an embodiment of the present invention arranged to be at least partially received into a housing or casing of an electronics unit of downhole equipment.

FIG. 3 shows a particular embodiment of an optical device 32 for use with a downhole electronics unit. The optical device is shown in side, profile view. In practice, the device is cylindrical in cross section A-A.

The optical device has a body 44 of a transparent machined plastics material, such as polycarbonate, acrylic, nylon etc. Glass may also be used, though a plastic material is preferred.

The body has annular grooves 46 therearound to receive o-rings for sealing the device within a housing or casing of a downhole unit, such as an electronics unit. In this embodiment, the transparent material of the body allows light to pass therethrough. Thus, the body forms a light path of the light to travel through. Other materials can also be suitable, depending on the type of light or other electromagnetic wave used. Preferably the body allows infra red light to pass therethrough. UV (ultra-violet light) may also be transmitted, or alternatively light in the visible spectrum.

At least a portion of the body is shaped to fit within a housing or casing of a component of downhole equipment, such as an electronics unit or a greaser unit or extension piece etc.

A first end 48 of the body is shaped so that an end surface 50, in use, faces the light emitters 16,18 or other light emitters depending on the equipment used and required application.

Light from one or more such emitters is transmitted by the light path through the body to impinge on a light path altering means 52. In this embodiment, the light path altering means includes a reflector 54.

The reflector reflects some or a majority of the light impinging upon it, and said reflected light is re-directed sideways (S) with respect to a longitudinal direction (L) of the device. The light path altering means may be provided, as in this embodiment, by forming a recess in its second end 56. The recess may form a conical surface 58 to which a reflective material is applied, such as a silvery coating.

Figure 4:
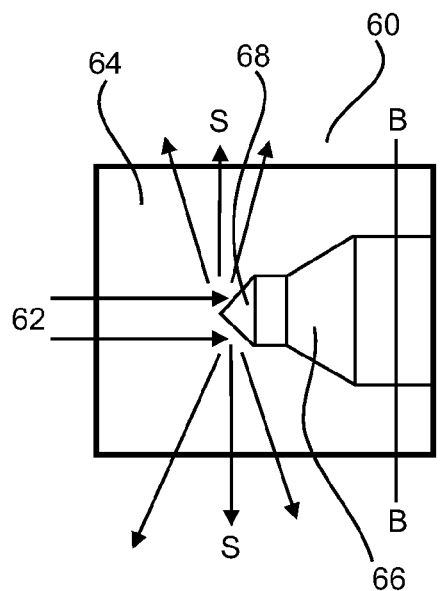
FIG. 4 shows an alternative embodiment of an optical device according to the present invention.

FIG. 4 shows an alternative embodiment of the present invention which works in the same manner as that of FIG. 3.

This alternative form of optical device 60 is provided as an insert for use with a downhole probe. Again, this device as the one above in FIG. 3, is shown in side view but is a cylinder with a circular cross section B-B. Light 62 entering the device 60 passes through the body 64 material and reflects off of a protrusion 66 into the envelope of the cylinder.

The protrusion is a machined surface coated from the exterior with a reflective material. A conical surface 68 assists in diffracting light sideways (S).

It will be appreciated that the light path altering means may be a dished or domed end to the device and which is coated or covered in a reflective material.

It will be appreciated that the optical device can be inserted into a downhole component and removed from replacement or access to an end of the electronics unit as required. Otherwise, the optical device can be left in situ to transmit light from/to the electronics unit. This can avoid the need to disassemble the electronics unit from the backend assembly, greaser unit or probe etc to which it is connected.

The electronics unit can be switched on or off by sending a controlling optical signal to the electronics unit through the optical device.

It will be appreciated that the optical device may be formed of one or multiple parts. For example, the optical device may be machined as a monolithic component or may be formed of multiple sub-components brought together, which may be bonded together or simply abutting in use.

It will be appreciated that light impinging on the light path altering means can be emitted sideways omni-directionally. Thus, and of great benefit to an operator, the optical device needs no alignment with the at least one aperture of the downhole assembly through which the light is to be transmitted.

The invention claimed is:

1. A device that transfers at least one electromagnetic signal to or from an electronics unit of downhole equipment, the device including a body and an electromagnetic signal direction altering means, the body having a light path arranged to allow the electromagnetic signal from an electromagnetic wave source associated with the electronics unit to pass to the electromagnetic signal direction altering means, the electromagnetic signal direction altering means causing the electromagnetic signal to change direction of travel, the device, in use, configured to transmit or receive the electromagnetic signal through at least one aperture through a side wall of a component of downhole equipment.

2. The device of claim 1, including a unitary or monolithic body.

3. The device of claim 1, including a multi component body.

4. The device of claim 3, wherein the multiple components of the body are bonded together.

5. The device of claim 1 with the electromagnetic signal direction altering means arranged to redirect electromagnetic signals incoming to the electronics unit and/or outgoing from the electronics unit.

6. The device of claim 1, wherein the direction of the signal is altered within the body of the device.

7. The device of claim 1, including a reflector to reflect at least a portion of the electromagnetic signal.

8. The device of claim 7, the reflector including a reflective material applied to, mounted to, or formed on or within the body.

9. The device of claim 8, the reflector including a silvered, shiny or polished coating or material provided on an end portion of the device.

10. The device of claim 8, the reflector embedded within or attached to the device.

11. The device of claim 1, including a recessed end portion that includes an internally projecting conical, domed, facetted and/or tapered end surface of the body.

12. The device of claim 1, wherein the electromagnetic signal direction altering means includes a boundary at a change of material or edge of a portion of the device.

13. The device of claim 12, wherein the device has a refractive index such that the light alters direction when passing through the device due to the refractive index.

14. The device of claim 1, the device formed of or including glass and/or plastics material.

15. The device of claim 1, wherein at least a portion of the device is arranged to fit, for operational use, within an end of housing/casing of the electronics unit.

16. The device of claim 1, wherein an end portion of the device extends from the end of the electronics unit so as to extend into a housing/casing of a piece of downhole equipment once the device, electronics unit and downhole equipment are assembled together.

17. The device according to claim 16, wherein an end of the device from where light is to be emitted when an electromagnetic signal is conveyed from the electronics unit extends into a greaser unit or a tube of a drill string, the greaser unit or tube of the drill string being the component of the downhole equipment, so that an electromagnetic wave can emit from or into the at least one aperture through a side wall of the respective greaser unit or tube section.

18. The device of claim 1, wherein the electromagnetic signal includes infra-red light, ultra violet (UV) or visible spectrum light.

19. The device of claim 18, the device being an optical device to transmit the electromagnetic signal in the form of visible light through a window provided in the at least one aperture.

20. The device of claim 1, including the at least one aperture provided through at least one side wall of the device, the device configured to redirect the electromagnetic signal through a side of the device.

21. A downhole data gathering system, including a communication device arranged to communicate wirelessly with an electronics unit of downhole equipment, the downhole equipment including an electronics unit configured to obtain data relating to a borehole into which the electronics unit is inserted or to obtain data relating to equipment used within the borehole system, and a device that transfers electromagnetic signals to or from the electronics unit of the downhole equipment, the device including a body and an electromagnetic signal direction altering means, the body having a light path arranged to allow the electromagnetic signals from an electromagnetic wave source associated with the electronics unit to pass to the electromagnetic signal direction altering means, the electromagnetic signal direction altering means causing the electromagnetic signal to change direction of travel and wherein the device is configured to enable the electromagnetic signals to be transmitted to or received from the electronics unit whilst the electronics unit is connected to the downhole equipment, the device enabling transmission of the electromagnetic signals from the electronics unit to the wireless communication device, or from the wireless communication device to the electronics unit, through at least one aperture in a side wall of the downhole equipment.

22. The downhole data gathering system of claim 21, the device including a multi component body.

23. The downhole data gathering system of claim 22, wherein the multiple components of the body are bonded together.

24. The downhole data gathering system of claim 21, the device including an electromagnetic signal direction altering means arranged to redirect electromagnetic signals incoming to the electronics unit and/or outgoing from the electronics unit.

25. The downhole data gathering system of claim 24, wherein the electromagnetic signal direction altering means includes a boundary at a change of material or edge of a portion of the device.

26. The downhole data gathering system of claim 21, the device including a reflector.

27. The downhole data gathering system of claim 26, the reflector including a reflective material applied to, mounted to, or formed on or within the body.

28. The downhole data gathering system of claim 26, the reflector including a silvered, shiny or polished coating or material provided on an end portion of the device.

29. The downhole data gathering system of claim 26, the reflector embedded within or attached to the device.

30. The downhole data gathering system of claim 21, the device including a recessed end portion including an internally projecting conical, domed, facetted and/or tapered end surface of the body.

31. The downhole data gathering system of claim 21, including the at least one aperture provided through at least one side wall of the device, the optical device configured to redirect the electromagnetic signals through a side of the device.

32. The downhole data gathering system of claim 21, the device formed of or including glass and/or plastics material.

33. The downhole data gathering system of claim 21, wherein at least a portion of the device is arranged to fit, for operational use, within an end of housing/casing of the electronics unit.

34. The downhole data gathering system of claim 21, wherein an end portion of the device extends from the end of the electronics unit so as to extend into a housing/casing of a piece of downhole equipment once the device, electronics unit and downhole equipment are assembled together.

35. The downhole data gathering system of claim 21, wherein an end of the device from where an electromagnetic wave is to be emitted when an electromagnetic signal is conveyed from the electronics unit extends into a greaser unit or a tube of a drill string, the greaser unit or tube of the drill string being the component of downhole equipment, so that the electromagnetic wave can emit from or into the at least one aperture through a side wall of the respective greaser unit or tube section.

36. The downhole data gathering system of claim 21, wherein the direction of the electromagnetic signal is altered within the body of the device.

37. The downhole data gathering system of claim 21, wherein the device has a refractive index such that the electromagnetic signal alters direction when passing through the device due to the refractive index.

38. The downhole data gathering system of claim 21, wherein the electromagnetic signal includes infra-red light, ultra violet (UV) or visible spectrum light.

39. The downhole data gathering system of claim 38, the device being an optical device to transmit the electromagnetic signal in the form of visible light through a window provided in the at least one aperture.

40. The downhole data gathering system of claim 21, the device including a unitary or monolithic body.

* * * * *